United States Patent
Tanno (10) Patent No.: US 11,660,915 B2
(45) Date of Patent: May 30, 2023

(54) PNEUMATIC TIRE AND METHOD OF MANUFACTURING SAME

(71) Applicant: The Yokohama Rubber Co., LTD., Tokyo (JP)

(72) Inventor: Atsushi Tanno, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 715 days.

(21) Appl. No.: 15/317,700

(22) PCT Filed: Jun. 5, 2015

(86) PCT No.: PCT/JP2015/066329
§ 371 (c)(1),
(2) Date: Dec. 9, 2016

(87) PCT Pub. No.: WO2015/190410
PCT Pub. Date: Dec. 17, 2015

(65) Prior Publication Data
US 2017/0113496 A1    Apr. 27, 2017

(30) Foreign Application Priority Data
Jun. 9, 2014    (JP) .............................. JP2014-118995

(51) Int. Cl.
*B60C 19/00*    (2006.01)
*B60C 5/00*    (2006.01)
(Continued)

(52) U.S. Cl.
CPC .......... *B60C 19/00* (2013.01); *B29D 30/0061* (2013.01); *B29D 30/0681* (2013.01);
(Continued)

(58) Field of Classification Search
CPC ........ B29D 2030/0072; B29D 30/0061; B29D 30/0681; B29D 30/06; B29D 30/00; B60C 19/002; B60C 19/00; B60C 5/00
See application file for complete search history.

(56) References Cited

U.S. PATENT DOCUMENTS 5,458,173 A * 10/1995 Yamashita ............ B60C 9/2006
152/538
2009/0159172 A1    6/2009 Tanno et al.
(Continued)

FOREIGN PATENT DOCUMENTS

| JP | 2006-044503 | 2/2006 |
| JP | 2008-149461 | 7/2008 |

(Continued)

OTHER PUBLICATIONS

English machine translation of JP 2006-44503 A, Feb. 16, 2006.*
(Continued)

*Primary Examiner* — Adrienne C. Johnstone
(74) *Attorney, Agent, or Firm* — Thorpe North & Western (57) ABSTRACT

A pneumatic tire mounted with surface fastener members for attaching an object to a tire inner surface, comprises: at least eight surface fastener members having an intermittent arrangement on a tread inner circumferential surface, the surface fastener members having a uniform cross-sectional dimension, an overall band-like shape, and a length in a tire axial direction from 50% to 120% of a maximum belt width of the pneumatic tire; wherein an angle θ between a longitudinal direction of the surface fastener members and the tire axial direction is from 0 degrees to 45 degrees; and an installation period in a tire circumferential direction is from 80% to 150% of the length in the tire axial direction of the surface fastener members.

9 Claims, 4 Drawing Sheets

(51) Int. Cl.
  *B29D 30/06* (2006.01)
  *B29D 30/00* (2006.01)
  *B60C 23/04* (2006.01)
  *B60C 17/00* (2006.01)

(52) U.S. Cl.
  CPC ............... *B60C 5/00* (2013.01); *B60C 17/00* (2013.01); *B60C 19/002* (2013.01); *B60C 23/0493* (2013.01); *B29D 2030/0072* (2013.01)

(56) References Cited

U.S. PATENT DOCUMENTS

| | | | |
|---|---|---|---|
| 2010/0018622 A1* | 1/2010 | Tanno | B60C 19/002 |
| 2010/0043951 A1* | 2/2010 | Tanno | B60C 19/002 |
| 2011/0290395 A1 | 12/2011 | Tanno et al. | |
| 2012/0000588 A1 | 1/2012 | Tanno et al. | |
| 2012/0291933 A1 | 11/2012 | Tanno et al. | |
| 2013/0008588 A1 | 1/2013 | Tanno et al. | |
| 2013/0248071 A1 | 9/2013 | Tanno et al. | |

FOREIGN PATENT DOCUMENTS

| | | |
|---|---|---|
| JP | 2008-272954 | 11/2008 |
| JP | 2008-279703 | 11/2008 |
| JP | 2009-154320 | 7/2009 |
| JP | 2012-011986 | 1/2012 |
| JP | 2012-240507 | 12/2012 |
| WO | WO 2008/072449 | 6/2008 |
| WO | WO 2008/133093 | 11/2008 |

OTHER PUBLICATIONS

English machine translation of JP 2008-279703 A, Nov. 20, 2008.*
Random House Kernerman Webster's College Dictionary, online definition of "band", K Dictionaries Ltd., 2010.*
International Search Report for International Application No. PCT/JP2015/066329 dated Jun. 30, 2015, 4 pages, Japan.

* cited by examiner

PNEUMATIC TIRE AND METHOD OF MANUFACTURING SAME

TECHNICAL FIELD

The present technology relates to a pneumatic tire and a method of manufacturing the pneumatic tire. The present technology particularly relates to a pneumatic tire provided with a surface fastener for attaching a desired object to a tire inner surface via mechanical engagement, in particular the engaged surface fastener being not susceptible to disengagement, and a method of manufacturing the pneumatic tire.

BACKGROUND ART

Pneumatic tires are known that are provided with a surface fastener on the tire inner circumferential surface continuously or intermittently in the circumferential direction, the surface fastener being for attaching a desired functional object inside the tire (see Japanese Unexamined Patent Application Publication Nos. 2006-044503A, 2008-272954A, 2008-149461A, 2009-154320A).

However, the engagement of the surface fastener is afforded by the mechanical engagement between a plurality of engaging element groups which constitute the surface fastener. As a result of this configuration, as the tire rolls, the engagement force may weaken. In particular, should the engagement force weaken and then this weakening progress to a stage where disengagement occurs, the functional object inside the tire will cease functioning.

Additionally, in a tire of a size at which deflection is great at a tread portion when the tire rolls, engaged loop members and hook members of the surface fastener may disengage due to the shear force in the tire circumferential direction produced by the repeated deformation upon rolling.

SUMMARY

The present technology provides a pneumatic tire in which engaged loop members and hook members of a surface fastener are not susceptible to disengagement, thus having the effect of significantly preventing an attached functional object from falling off, having application to a tire of a size at which deflection is great at a tread portion when the tire rolls; and a method of manufacturing such a pneumatic tire.

Note that in the present technology, "tire of a size at which deflection is great at a tread portion when the tire rolls" refers generally to a tire with a high aspect ratio, and refers specifically to a tire with an aspect ratio of 50% or greater. However, the present technology is not particularly limited to tires with a high aspect ratio.

A pneumatic tire of the present technology has the configuration described in (1) below.

(1) A pneumatic tire mounted with surface fastener members for attaching an object to a tire inner circumferential surface, comprising:

at least eight surface fastener members having an intermittent arrangement on a tread inner circumferential surface, the surface fastener members having a uniform cross-sectional dimension, an overall band-like shape, and a length in a tire axial direction from 50% to 120% of a maximum belt width of the pneumatic tire; wherein an angle θ between a longitudinal direction of the surface fastener members and the tire axial direction is from 0 degrees to 45 degrees; and an installation period in a tire circumferential direction is from 80% to 150% of the length in the tire axial direction of the surface fastener members.

The pneumatic tire according to the present technology is preferably configured as described in any one of (2) to (4) below.

(2) The pneumatic tire according to (1), wherein, in a plane traversing the tire axial direction, the surface fastener members have the intermittent arrangement in which surfaces where the surface fastener members are not disposed and surfaces where the surface fastener members are disposed are alternately arranged.

(3) The pneumatic tire according to (1) or (2), wherein a width (W) of the surface fastener members is from 5 mm to 30 mm.

(4) The pneumatic tire according to any one of (1) to (3), wherein the surface fastener members are hook and loop surface fastener members, the hook-side members being installed on the tire side and the surface fastener members disposed on the tire side being made of resin; and the surface fastener members include:

engaging elements disposed on the side closer to a tire cavity, and anchoring elements disposed on the side closer to a tire outer circumferential surface, the anchoring elements being installed digging into a rubber layer on a tire inner surface.

In addition, a method of manufacturing a pneumatic tire of the present technology that achieves the object described above has the following configuration (5).

(5) A method of manufacturing the pneumatic tire described in any one of (1) to (4), the method comprising the steps of:

installing in advance surface fastener members on an adhesive rubber layer with intervals therebetween; and attaching the adhesive rubber layer to an inner surface of an innerliner layer.

According to the pneumatic tire of the present technology of (1), a pneumatic tire is provided in which engaged loop members and hook members of a surface fastener member are not susceptible to disengagement, thus having the effect of significantly preventing an attached functional object from falling off, having application to a tire of a size at which deflection is great at a tread portion when the tire rolls. The effect of the present technology is excellent in tires with an aspect ratio whereby deflection is great at a tread portion when the tire rolls, for example, a tire with an aspect ratio of 50% or greater, and the effect is remarkable in tires with an aspect ratio of 60% or greater.

According to the pneumatic tire of any one of (2) to (4), a pneumatic tire is provided that has greater and more reliable effects than those of the pneumatic tire of (1).

In particular, according to (2) or (3), a pneumatic tire is provided with sufficient engagement force of the surface fastener members as a whole as well with the engaged loop members and hook members of a surface fastener member being not susceptible to disengagement. In particular, according to (4), a pneumatic tire is provided in which the engagement force of the surface fastener members as a whole is great and the engagement is not susceptible to disengagement, and additionally, the fixing strength of the surface fastener members is great, the engagement force as a whole is great, and durability is excellent.

According to the method of manufacturing a pneumatic tire of (5), a method of manufacturing a pneumatic tire is provided in which engaged loop members and hook members of a surface fastener member are not susceptible to disengagement, thus having the effect of significantly preventing an attached functional object from falling off, having application to a tire of a size at which deflection is great at a tread portion when the tire rolls.

DETAILED DESCRIPTION

A detailed explanation of a pneumatic tire and a method of manufacturing such a pneumatic tire of the present technology will be given below with reference to the drawings.

Figure 1:
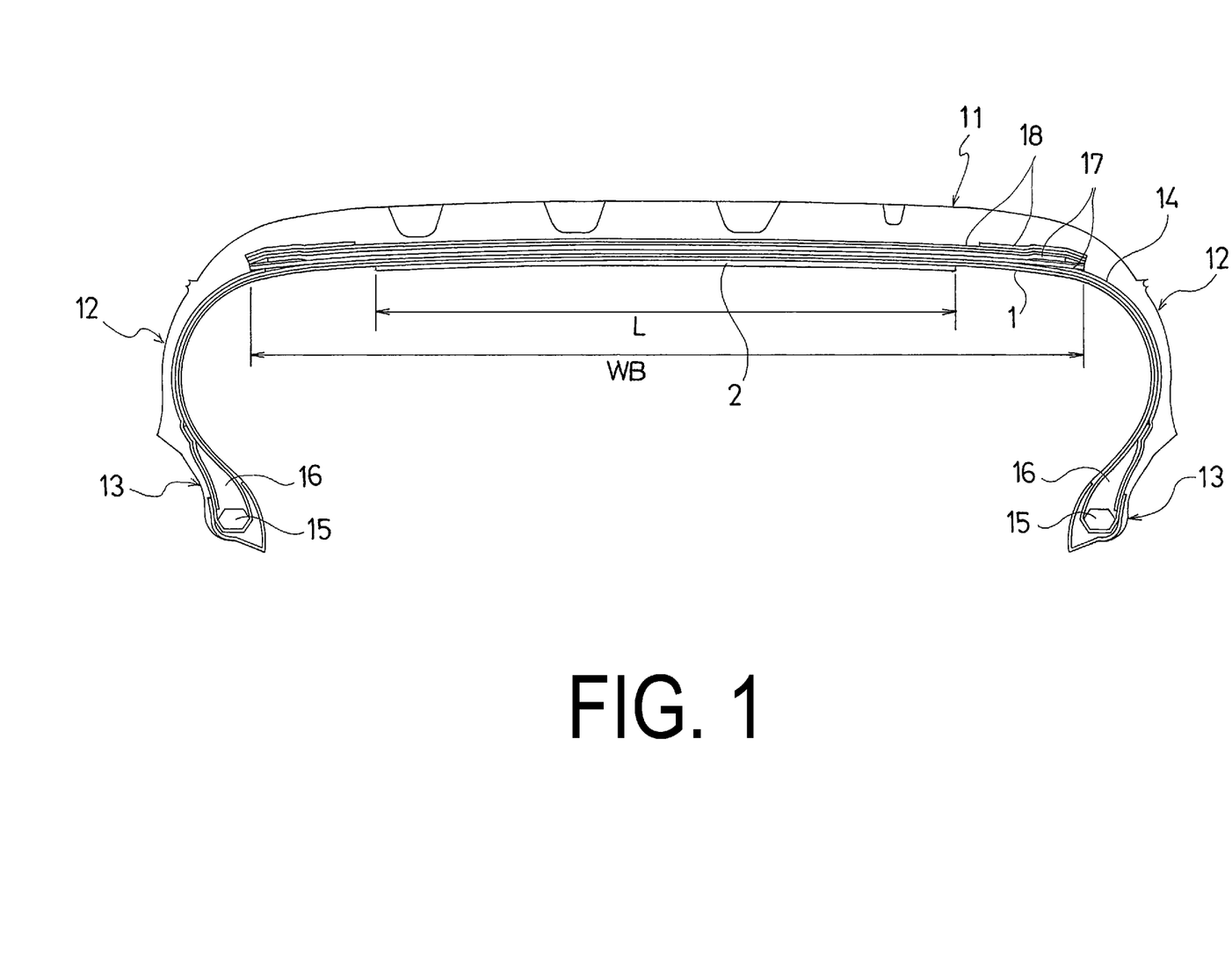
FIG. 1 is a meridian cross-sectional view illustrating an example of a pneumatic tire according to the present technology.

FIG. 1 illustrates one example of a pneumatic tire according to the present technology. As illustrated in FIG. 1, a pneumatic tire of the present technology is provided with a tread portion 11 extending in the tire circumferential direction to form an annular shape, a pair of sidewall portions 12 disposed on both sides of the tread portion 11, and a pair of bead portions 13 disposed on the inner side in the tire radial direction of the sidewall portions 12.

A carcass layer 14 is mounted between the pair of bead portions 13, 13. The carcass layer 14 includes a plurality of reinforcing cords extending in the tire radial direction and is folded back around bead cores 15 disposed in each of the bead portions 13 from a tire inner side to a tire outer side. A bead filler 16 having a triangular cross-sectional shape formed from a rubber composition is disposed on a periphery of the bead cores 15.

A plurality of belt layers 17 is embedded on the outer circumferential side of the carcass layer 14 in the tread portion 11. These belt layers 17 include a plurality of reinforcing cords that are inclined with respect to the tire circumferential direction and the reinforcing cords are disposed so that the reinforcing cords of each layer are orientated so as to intersect each other. In the belt layers 17, the inclination angle of the reinforcing cords with respect to the tire circumferential direction is set in a range from, for example, 10° to 40°. Steel cords are preferably used as the reinforcing cords of the belt layers 17. For the purpose of improving the high-speed durability, at least one belt cover layer 18, in which the reinforcing cords line up at an angle of, for example, 5° or less with respect to the tire circumferential direction, is disposed on the outer peripheral side of the belt layers 17. Organic fiber cords of nylon, aramid, or the like are preferably used as the reinforcing cords of the belt cover layer 18.

Note that the tire internal structure described above is exemplary of a pneumatic tire, but is not limited thereto.

Figure 2A:
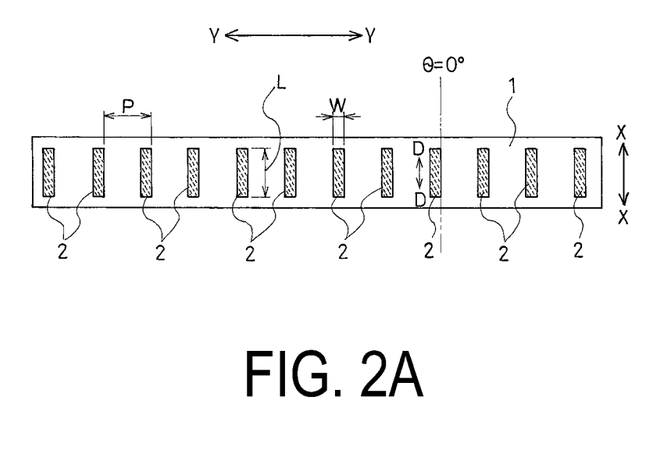
FIGS. 2A and 2B are developed views for describing an example of an embodiment of the pneumatic tire according to the present technology and schematically illustrate the full circumference of an inner surface of a tire tread portion developed.
Figure 2B:
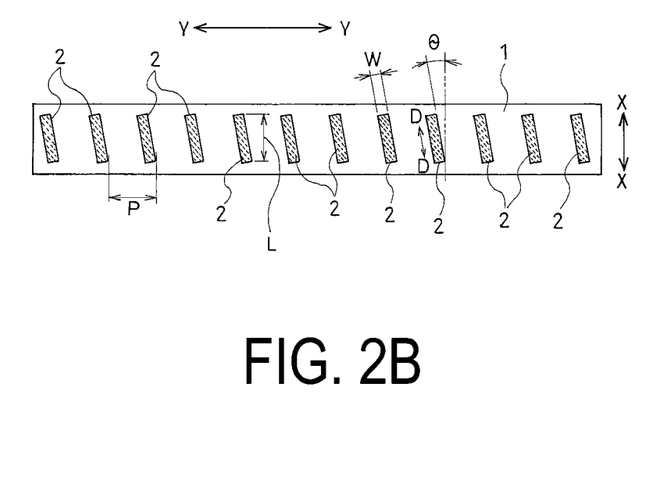

As illustrated in FIG. 1, surface fastener members 2 are mounted on the tire inner circumferential surface 1. The surface fastener members 2 are used for attaching an object to the tire inner circumferential surface 1. The pneumatic tire mounted as such with the surface fastener members 2 for attaching an object to the tire inner circumferential surface 1, as illustrated in FIGS. 2A and 2B, includes a plurality of surface fastener members 2 disposed in a manner in which at least eight surface fastener members 2 are disposed intermittently on a tread inner circumferential surface. The surface fastener members 2 have a uniform cross-sectional dimension, an overall band-like shape, and a length L in a tire axial direction of the surface fastener members 2 from 50% to 120% of a maximum belt width WB of the pneumatic tire (see FIG. 1). The length L in the tire axial direction of the surface fastener members 2 may be from 105% to 120% of the maximum belt width WB of the pneumatic tire. An angle θ between a longitudinal direction of the surface fastener members 2 and the tire axial direction (X-X direction) is from 0 degrees to 45 degrees. An installation period P in a tire circumferential direction (Y-Y direction) is from 80% to 150% of the length L in the tire axial direction of the surface fastener members 2. The installation period P in the tire circumferential direction (Y-Y direction) may be from 110% to 150% of the length L in the tire axial direction of the surface fastener members 2. FIG. 2A illustrates a configuration in which the angle θ is approximately 0 degrees. FIG. 2B illustrates a configuration in which the angle θ is approximately 10 degrees.

Typically, when tires, including high aspect ratio tires of a size at which deflection is great at a tread portion when the tire rolls, are provided with a surface fastener member installed continuously in the tire circumferential direction, the engaged loop members and hook members may disengage.

Whereas, a pneumatic tire of the present technology is provided with the surface fastener members 2 installed in a non-continuous manner in the tire circumferential direction. As a result, the engaged loop members and hook members are prevented from disengaging. Not having a surface fastener member continuous in the circumferential direction results in the shear forces between the loop members and hook members caused by circumferential deflection being broken up and mitigated at the intermittent section of the surface fastener members 2.

In the present technology, it is important that the length L in the tire axial direction of the installed surface fastener members 2 is from 50% to 120% of the maximum belt width WB of the pneumatic tire. When the length L in the tire axial direction of the surface fastener members 2 is less than 50% of the maximum belt width WB of the pneumatic tire, the end portion of the attached object in the tire width direction cannot be sufficiently affixed, resulting in damage due to deformation of the tread portion 11 when the tire rolls. When the length L is greater than 120%, the surface fastener members 2 may interfere with the shoulder portions of the tire, which is not preferable. The suitable range of the length L in the tire axial direction of the installed surface fastener members 2 is from 60% to 120% of the maximum belt width WB of the pneumatic tire.

It is important that the surface fastener members 2 are disposed having a comparatively long length L in the tire axial direction so that the surface fastener members 2 are afforded sufficient area to function as a surface fastener. Specifically, the length L in the tire axial direction of the surface fastener members 2 is an important factor in deciding, by multiplying the values of the installation period P (i.e. intermittent arrangement) of the surface fastener members 2 described below and the width W of the surface fastener members 2, the min/max of the area the surface fastener members 2 can function as a surface fastener, which is important to the present technology.

Additionally, the installation period P of the installed surface fastener members 2 is preferably from 80% to 150% of the length L in the tire axial direction of the surface fastener members 2. When the installation period P is less than 80%, the shear force mitigation effect described above decreases. When the installation period P is greater than 150%, the overall engagement force decreases, thus making it difficult to maintain a sufficient engagement force.

According to the research of the present inventors, it is important that the number of surface fastener members 2 installed around the entire circumference is 8 or greater, and the number is preferably from 8 to 42. Taking engagement force, processing time and cost, and the like into consideration, the number is more preferably from 12 to 26. The surface fastener members 2 are most preferably members using the method known as the hook and loop method with loop members and hook members. However, a method in which the members are not perfectly hook shaped or loop shaped may be used. To obtain reliable engagement force, the number of hooks or loops provided on the entire tire is preferably 4000 or greater. The number provided on the entire tire is more preferably from 5000 to 40000.

To obtain reliable engagement force, it is important that the angle θ between the longitudinal direction of the surface fastener members 2 (D-D direction) and the tire axial direction (X-X direction) is in a range from 0 degrees to 45 degrees, and preferably from 0 degrees to 30 degrees. Note that the values of the angle θ should be understood to include "±" in its meaning.

Figure 3A:
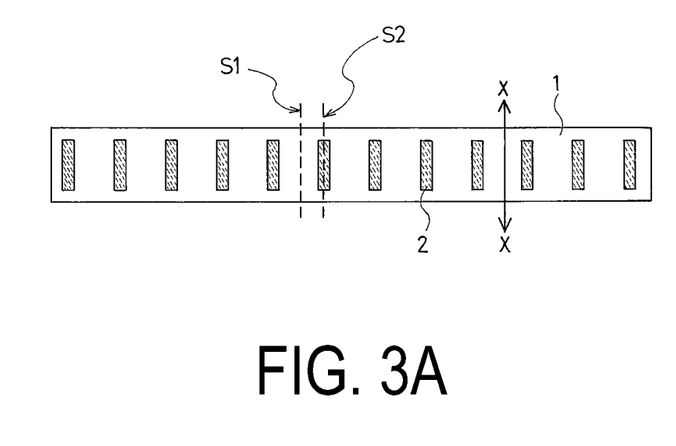
FIGS. 3A and 3B are developed views for describing an example of an embodiment of the pneumatic tire according to the present technology and schematically illustrate the full circumference of the inner surface of the tire tread portion developed.
Figure 3B:
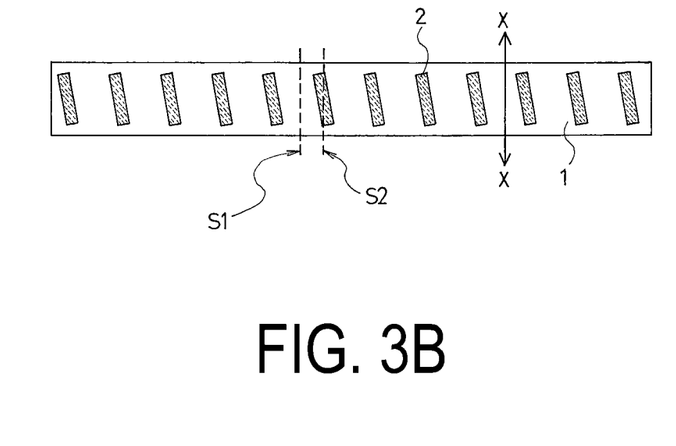

In the present technology, the surface fastener members 2 are preferably disposed forming an arrangement in the plane traversing the tire axial direction of surfaces where the surface fastener members 2 are not disposed and surfaces where the surface fastener members 2 are alternately disposed. This arrangement is illustrated in FIGS. 3A and 3B. By having such an arrangement in which surfaces S1 where the surface fastener members 2 are not disposed and surfaces S2 where the surface fastener members 2 are disposed are clearly and alternately present, the breaking down and mitigation effect on the shear force described above increases and becomes more reliable. "Surfaces where the surface fastener members are not disposed and surfaces where the surface fastener members are disposed being alternately present" can be explained in other words as referring to an arrangement in which, when seen from the tire axial direction, a surface fastener member continuous in the circumferential direction around the entire tire is not present on the tire inner circumferential surface, and instead distinct portions without a surface fastener member are intermittently present.

In the present technology, the width W of the surface fastener members 2 is preferably from 5 mm to 30 mm. This range is preferable because it is most suited to the attachment (engagement force) and detachment of an object. When the width is greater than 30 mm, it becomes difficult to detach an object. When the width is less than 5 mm, sufficient engagement force cannot be obtained.

Figure 4:
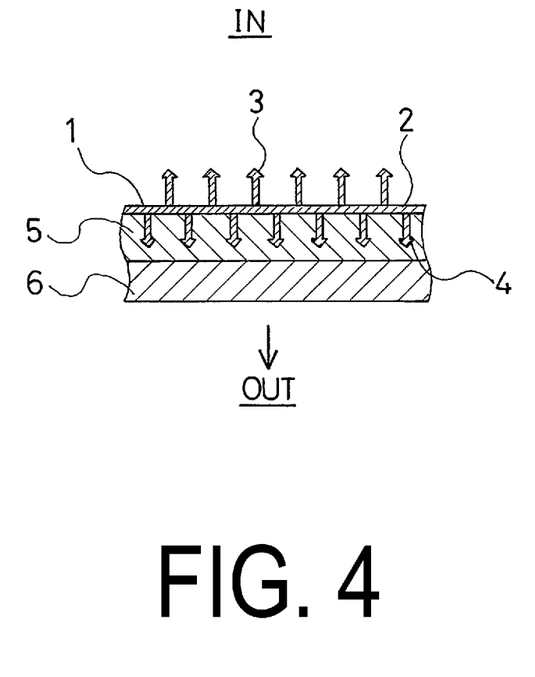
FIG. 4 is a drawing for describing an example of an embodiment of the pneumatic tire according to the present technology and illustrates a state in which a surface fastener member is mounted on a tire inner surface.

In the present technology, as described above, the surface fastener members 2 are preferably hook and loop surface fastener members. Additionally, when this is the case, an arrangement is preferable in which the hook-side members are disposed on the tire side, the surface fastener members on the tire side (hook-side members) are made of resin. The surface fastener members 2 preferably include engaging elements disposed on the side closer to the tire cavity and anchoring elements disposed on the side closer to the tire outer circumferential surface, the anchoring elements digging into a rubber layer on the tire inner surface. An example of this arrangement is illustrated in FIG. 4. In FIG. 4, IN denotes the tire cavity side, OUT denotes the tire outer circumferential surface side, 3 denotes the engaging elements, 4 denotes the anchoring elements, 5 denotes the adhesive rubber layer, and 6 denotes an innerliner layer. As illustrated in this drawing, the rubber layer on the tire inner surface into which the anchoring elements 4 dig upon installation includes in its meaning at least the adhesive rubber layer 5 as the rubber layer positioned closest to the cavity and in some cases may also include the innerliner layer 6 positioned on the side closer to the tire outer surface than the adhesive rubber layer 5.

Hard resin having excellent strength, durability, and durability can be used as the resin that constitutes the surface fastener members 2. However this is not a limitation, and various resins can be used including thermoplastic resins and thermosetting resins such as polyester resin and polyamide resin, resins known as engineering plastics, and the like. Additionally, thermoplastic resin compositions containing such resins and an elastomer can also be preferably used. The type and components of the used resin and thermoplastic resin composition should be decided in correlation with the properties of the target tire, the properties of the functional object to be attached, and the like.

In the present technology, the object to be attached to the tire inner circumferential surface 1 via the surface fastener members 2 is not particularly limited, and can be, for example, a sound-absorbing member, damping member, electronic component, and run-flat core.

A method of manufacturing a pneumatic tire of the present technology can include forming the adhesive rubber layer, disposing in advance the surface fastener members to be installed on the adhesive rubber layer with intervals therebetween, and attaching this to the inner surface of the innerliner layer of the tire as a process included in the typical tire manufacturing process.

When the surface fastener members are installed on the adhesive rubber layer and the adhesive rubber layer is attached to the inner surface of the innerliner layer in such a manner, though the surface fastener members cannot elongate in correspondence with the inflation molding upon vulcanization molding, the adhesive rubber layer between the surface fastener members elongates, allowing the members to follow the deformation upon inflation molding as a whole. Thus, such a process of installing the surface fastener members can be included as a part of the vulcanization molding process.

Note that when a pneumatic tire not of the present technology provided with a continuous surface fastener member is manufactured, because the surface fastener member is disposed continuous in the circumferential direction, the surface fastener member cannot follow the deformation upon tire molding (surface fasteners can only elongate by a few percent). As a result, only a method of attaching the surface fastener member after molding of the tire can be employed. Accordingly, compared to such conventional tires, a pneumatic tire of the present technology, in the manner described above, can include the installation of the surface fasteners as part of the vulcanization molding process, which is innovative.

EXAMPLES

Working Examples 1 to 4 and Comparative Example 1

Test tires of tire size 215/60R16 95H were prepared. Three kinds of test tires were prepared, tires according to the present technology with surface fasteners provided non-continuously (Working Examples 1 to 4) on the inner surface and tires not of the present technology with a surface fastener provided continuously on the inner surface (Comparative Example 1).

The Working Examples 1 to 4 of the present technology had the configuration illustrated in FIGS. 2A and 2B and each had 12 surface fastener members provided on the tread inner circumferential surface. The angle θ was θ=0 degrees (Working Example 1), θ=15 degrees (Working Example 2), θ=45 degrees (Working Example 3), and θ=0 degrees (Working Example 4). The installation period P was P=16 cm (Working Example 1), P=16 cm (Working Example 2), P=16 cm (Working Example 3), and P=16 cm (Working Example 4). The length L in the axial direction was L=15 cm (Working Example 1), L=15 cm (Working Example 2), L=15 cm (Working Example 3), and L=11 cm (Working Example 4).

All the test tires were provided with hook and loop surface fastener members and the hook members were disposed on the tire inner surface. The surface fastener members of Working Examples 1 to 4 all had a width of 2 cm and were all rectangular.

The surface fastener member of Comparative Example 1 was formed in a continuous band-like shape with a width of 2 cm.

For all the test tires, the surface fastener(s) was used to mount a sound-absorbing member (with a loop member of a hook and loop surface fastener attached and affixed) formed of urethane foam to the cavity portion. The test tires were tested by running the tires continuously for 80 hours at a running speed of 80 kmph (tire air pressure of 150 Pa and applied load of 5 kN).

After the running test, the state of engagement of the surface fastener portion of the test tires was inspected. Engagement separation (separation of the hook members and the loop members) was found in the tire of Comparative Example 1 but was not found in the tires of Working Examples 1 to 4 of the present technology.

The invention claimed is:

1. A pneumatic tire mounted with surface fastener members for attaching an object to a tire inner circumferential surface, comprising:
   a tread portion, a carcass layer, a plurality of belt layers on an outer circumferential side of the carcass layer in the tread portion, the belt layers each including a plurality of reinforcing cords that are inclined with respect to a tire circumferential direction so that the reinforcing cords of adjacent belt layers intersect each other, the inclination angle of the reinforcing cords being within a range of 10 to 40 degrees;
   at least eight surface fastener members having an intermittent arrangement on a tread inner circumferential surface of the tread portion,
   the surface fastener members having a uniform cross-sectional dimension,
   an overall band shape, and
   a length in a tire axial direction from 105% to 120% of a maximum belt width of the belt layers of the pneumatic tire; wherein
   an angle θ between a longitudinal direction of the surface fastener members and the tire axial direction is from 10 to 45 degrees; and
   an installation period in the tire circumferential direction is from 80% to 150% of the length in the tire axial direction of the surface fastener members.

2. The pneumatic tire according to claim 1, wherein, in a plane traversing the tire axial direction, the surface fastener members have the intermittent arrangement in which surfaces where the surface fastener members are not disposed and surfaces where the surface fastener members are disposed are alternately arranged.

3. The pneumatic tire according to claim 2, wherein a width (W) of the surface fastener members is from 5 mm to 30 mm.

4. The pneumatic tire according to claim 3, wherein
   the surface fastener members are hook-side members of hook and loop surface fasteners, the surface fastener members being made of resin; and
   the surface fastener members include:
   engaging hook elements disposed on the side closer to a tire cavity, and
   anchoring elements disposed on the side closer to a tire outer circumferential surface, the anchoring elements being installed digging into a rubber layer on the tire inner circumferential surface.

5. A method of manufacturing the pneumatic tire described in claim 4, the method comprising the steps of:
   installing in the advance surface fastener members on an adhesive rubber layer with intervals therebetween;
   attaching the adhesive rubber layer to an inner surface of an innerliner layer forming the tire inner circumferential surface; and
   inflation molding the tire during vulcanization molding such that the adhesive rubber layer elongates and the surface fastener members have the intermittent arrangement on the tread inner circumferential surface of the tread portion.

6. The pneumatic tire according to claim 1, wherein a width (W) of the surface fastener members is from 5 mm to 30 mm.

7. The pneumatic tire according to claim 1, wherein
   the surface fastener members are hook-side members of hook and loop surface fasteners, the surface fastener members being made of resin; and
   the surface fastener members include:
   engaging hook elements disposed on the side closer to a tire cavity, and
   anchoring elements disposed on the side closer to a tire outer circumferential surface, the anchoring elements being installed digging into a rubber layer on the tire inner circumferential surface.

8. The pneumatic tire according to claim 1, wherein the installation period in the tire circumferential direction is from 110% to 150% of the length in the tire axial direction of the surface fastener members.

9. A method of manufacturing the pneumatic tire described in claim 1, the method comprising the steps of:
   installing in advance the surface fastener members on an adhesive rubber layer with intervals therebetween;
   attaching the adhesive rubber layer to an inner surface of an innerliner layer forming the tire inner circumferential surface; and
   inflation molding the tire during vulcanization molding such that the adhesive rubber layer elongates and the surface fastener members have the intermittent arrangement on the tread inner circumferential surface of the tread portion.

\* \* \* \* \*